US006596658B1

(12) United States Patent
Putnam et al.

(10) Patent No.: US 6,596,658 B1
(45) Date of Patent: Jul. 22, 2003

(54) LAMINATED FABRIC WITH FIRE-RETARDANT PROPERTIES

(75) Inventors: Michael J. Putnam, Fuquay-Varina, NC (US); Herbert P. Hartgrove, Angier, NC (US)

(73) Assignee: Polymer Group, Inc., North Charleston, SC (US)

( * ) Notice: Subject to any disclaimer, the term of this patent is extended or adjusted under 35 U.S.C. 154(b) by 0 days.

(21) Appl. No.: 09/489,630

(22) Filed: Jan. 24, 2000

(51) Int. Cl.⁷ .............................. B32B 5/26; B32B 7/08; B32B 3/00
(52) U.S. Cl. .................. 442/384; 442/136; 442/382; 442/387; 442/408; 442/414; 428/920
(58) Field of Search ................................ 442/136, 382, 442/384, 387, 408, 414; 428/920

(56) References Cited

U.S. PATENT DOCUMENTS

| | | |
|---|---|---|
| 4,199,642 A | 4/1980 | Cooper et al. |
| 4,463,465 A | 8/1984 | Parker et al. |
| 4,547,904 A | 10/1985 | Long et al. |
| 4,726,987 A | 2/1988 | Trask et al. |
| 4,748,065 A | 5/1988 | Tanikella |
| 4,750,443 A | 6/1988 | Blaustein |
| 4,780,359 A | 10/1988 | Trask et al. |
| 4,937,136 A | 6/1990 | Coombs |
| 5,098,764 A | 3/1992 | Drelich et al. |
| 5,226,384 A | 7/1993 | Jordan |
| 5,244,711 A | 9/1993 | Drelich et al. |
| 5,252,386 A | 10/1993 | Hughes et al. |
| 5,279,878 A | 1/1994 | Footinger et al. |
| 5,389,716 A * | 2/1995 | Graves ........................ 524/492 |
| 5,475,903 A | 12/1995 | Collins |
| 5,578,368 A | 11/1996 | Forsten et al. |
| 5,609,950 A | 3/1997 | Kampl et al. |
| 5,766,746 A | 6/1998 | Kampl et al. |
| 5,822,833 A | 10/1998 | James et al. |
| 5,827,597 A | 10/1998 | James et al. |

\* cited by examiner

Primary Examiner—Terrel Morris
Assistant Examiner—Jenna-Leigh Befumo
(74) Attorney, Agent, or Firm—Wood, Phillips, Katz, Clark & Mortimer

(57) ABSTRACT

A laminated fabric consisting of a relatively lightweight layer formed of dimensionally stable, heat-resistant fibers, and a relatively heavyweight layer formed of one of more plies. The laminate is imaged on a three-dimensional support surface, and the laminate may be treated with a fire-retardant binder to stabilize the image and enhance the flame-retardant properties.

10 Claims, 1 Drawing Sheet

LAMINATED FABRIC WITH FIRE-RETARDANT PROPERTIES

BACKGROUND OF THE INVENTION

This invention relates to a durable and imaged flame-retardant nonwoven fabric that can be used for wall coverings, upholstery, apparel and other related applications. Several years ago, E. I du Pont de Nemours and Company developed flame-retardant materials sold under the trademarks NOMEX® and KEVLAR®. NOMEX® materials were developed for applications requiring dimensional stability and excellent heat resistance, and which do not flow or melt upon heating. Decomposition and charring does not proceed at a significant rate until well over 350° C. without melting. NOMEX® materials in fibrous form have been used in protective apparel and similar applications, and can be processed by conventional textile technology. Heretofore, comparable flame-retardant nonwoven fabrics have been expensive to manufacture, and because such fibers are relatively slick, stiff, and do not crimp well, they have not been susceptible of imaging by high pressure water jet entangling. Specific examples of prior art materials are set forth below.

U.S. Pat. No. 4,199,642 discloses a flame resistant fiberfill batt consisting of polyester fiberfill and synthetic organic filamentary materials, including poly(m-phenylene isophthalamide) blended therewith that maintains its physical integrity when exposed to the flame from a burning match.

U.S. Pat. No. 4,463,465 discloses an aircraft seat cushion including a highly heat-sensitive urethane foam covered by a flexible matrix, which may comprise a NOMEX® fabric. A further gas barrier layer may also be provided, which can also be a NOMEX® fabric.

A wet-type survival suit is disclosed in U.S. Pat. No. 4,547,904, including inner and outer NOMEX® layers which provide maximum protection against fire.

A fire-retardant panel is disclosed in U.S. Pat. No. 4,726,987 and 4,780,359 which includes one or more layers of NOMEX® fiber that may be combined with adjacent fibrous layers by needle punching.

U.S. Pat. No. 4,748,065 discloses a flame resistant fabric, wherein a spunlaced fabric formed of fibers, such as NOMEX®, is brush-coated with an aqueous slurry containing activated carbon particles. The resulting fabric was subsequently dried and softened by crepeing. Laminates, including spunlaced outer layers of NOMEX® fibers, are also disclosed.

A fire-blocking textile fabric is disclosed in U.S. Pat. No. 4,750,443 which includes a multi-layer structure consisting of three to seven nonwoven layers of hydroentangled nonwoven fabrics of poly(p-phenylene terephthalamide) and poly(p-phenylene isophthalamide) staple fibers. The layers of entangled aramid fabrics are consolidated by stitchbonding with an aramid thread.

U.S. Pat. No. 4,937,136 discloses a laminate for use in fire protective garments. The laminate includes a nonwoven fabric comprised of a blend of wool and synthetic fibers capable of high temperature performance, such as NOMEX®. The laminate includes an outer shell which may also be formed of NOMEX® and an intermediate moisture barrier layer.

An animal bed cover is disclosed in U.S. Pat. No. 5,226,384, which is formed of an aramid fabric sheet, e.g. KEVLAR® with a polyester fabric sheet laminated to it.

In U.S. Pat. No. 5,252,386, a fire retardant entangled polyester nonwoven fabric is disclosed which has balanced tensile strength properties in the cross- and machine-directions and improved fire retardant properties by cross-stretching the entangled fabric, after the fabric has been wetted with an aqueous-based fire retardant composition, and drying the wetted fabric while maintaining it in its stretched state.

U.S. Pat. No. 5,279,879 discloses a flame-retarding nonwoven fabric formed of partially graphitized polyacrylonitrile fibers that are bonded by water jet needling. The fabric may be reinforced by warp-wise and weft-wise threads, and the fabric may be combined with a decorative fabric/material by adhesive securement.

U.S. Pat. No. 5,475,903 discloses a fabric that is formed by carding synthetic fibers, such as polyester fibers, cross-lapping the carded web to orient the fibers in the cross-direction, drafting the cross-lapped web to reorient certain of the fibers in the machine-direction, applying unbonded wood fibers to the top of the drafted web, and hydroentangling the resulting web to entangle the wood fibers with those of the polyester drafted web. A liquid fire-retardant composition is then applied to the hydroentangled web.

In U.S. Pat. No. 5,578,368, a fire-resistant material is disclosed, which includes a fiberfill batt, that may comprise polyester fibers, and a fire-resistant aramid fibrous layer like NOMEXI®, at one, or both, faces of the batt. The aramid fiber layer may be joined to the fiberfill batt by hydroentangling.

U.S. Pat. Nos. 5,609,950 and 5,766,746 disclose a flame-retardant nonwoven fabric wherein fleece, including cellulose fibers having a flame-retardant containing phosphorus, is bonded by water jet entanglement.

From the foregoing, it is clear that the prior art lacks a teaching of an imaged flame-retardant nonwoven fabric, and particularly such a fabric that is relatively low in cost by virtue of lamination by water jet entanglement of one or more relatively low cost webs with a relatively high cost flame retardant web, such as NOMEX®, or the like.

SUMMARY OF THE INVENTION

The fabric of the present invention is a laminate including a first layer formed of dimensionally stable, heat-resistant fibers, such as NOMEX® fibers commercially available from E. I. du Pont de Nemours and Company. While the heat and flame-resistant properties of such fibers are well understood and appreciated, commercialization of products incorporating such fibers to-date has been somewhat limited, because such fibers are sufficiently high in cost that manufacturers of commercial products wherein heat and flame-resistance are important have sought less costly alternatives. The present invention overcomes this problem by using a relatively low basis weight NOMEX® layer, and bonding thereto a lower cost support layer having a higher basis weight. The lower cost layer provides support and basis weight required to form the high volume, three-dimensional pattern in the layer of NOMEX® fibers. The resulting laminate is a relatively heavy weight fabric that is imaged on a three-dimensional support surface to incorporate aesthetic appeal to at least the NOMEX® layer. In use, it is intended that the layer formed of heat-resistant fibers, rather than the support layer, face the flame source. The resulting laminate has a fire-retardant binder applied thereto to stabilize the image, provide enhanced durability, and improve the flame-retardant characteristics of the laminate.

DESCRIPTION OF PREFERRED EMBODIMENTS

Figure 1:
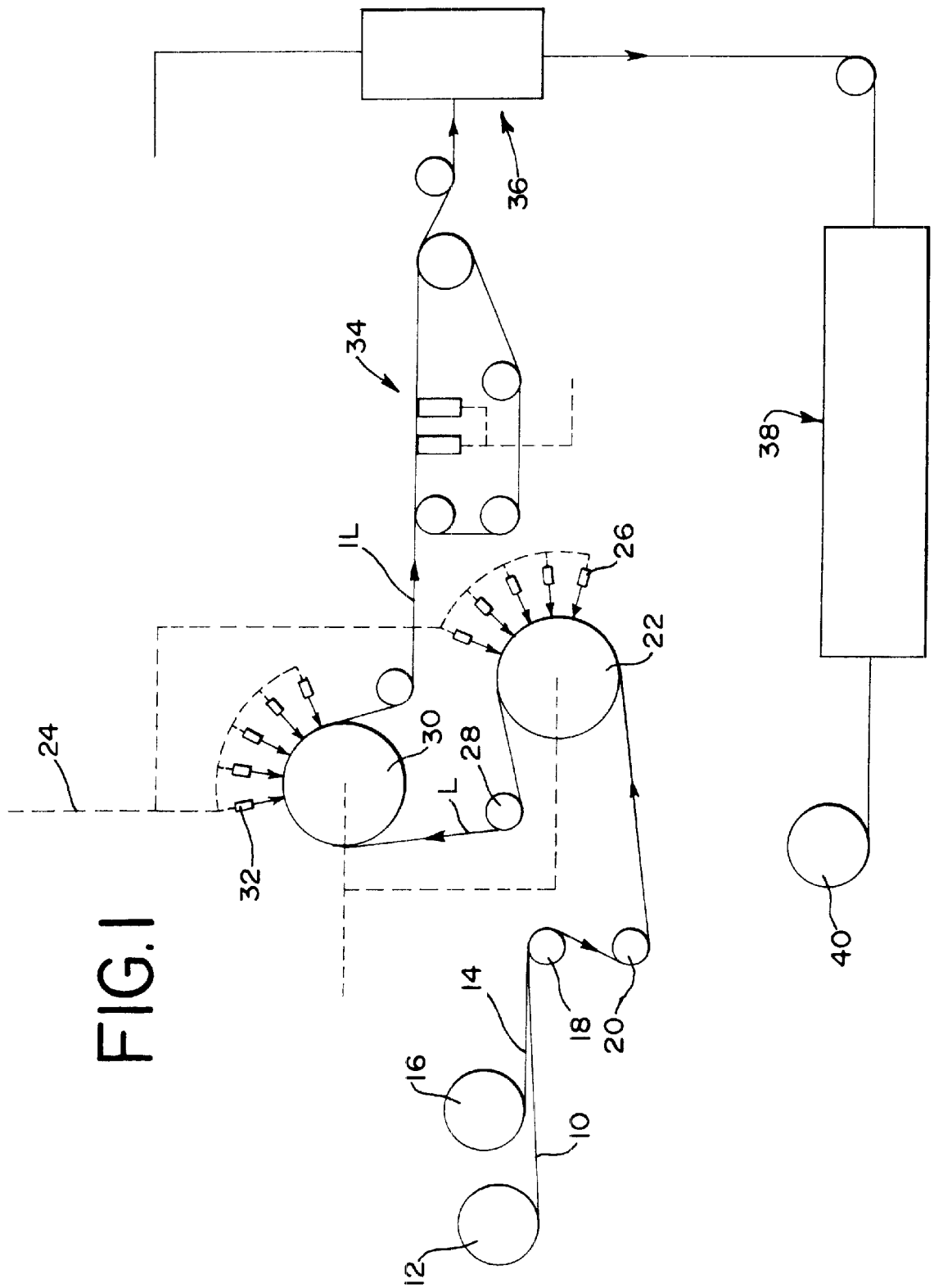
FIG. 1 is a schematic representation of a production line upon which the process of the present invention is practiced and the fabric of the present invention is produced.

With reference to the drawing, the first NOMEX® layer 10 is fed from unwinder 12, and the second support layer 14 is fed from unwinder 16 into juxtaposition with one side of first layer 10.

While it is not critical to the present invention, it is preferred that layers 10 and 14 both be preformed and prebonded layers, with known basis weights and other physical properties, so that the layers can be pre-inspected prior to lamination to minimize process start-up waste and to assure that only acceptable product is produced. Alternatively, layers 10 and 14 may be formed in-line, and unwinders 12 and 16 can be eliminated. In either event, the layer 10 of NOMEX® fibers may be formed by carding and airlaying, as is well understood in the art.

Support layer 14 may be a staple fiber web, such as a thermally point-bonded polyester spunbond web. Alternatively, and preferably, layer 14 may be a continuous polyester filament web formed in accordance with the teachings of commonly assigned U.S. patent application Ser. No. 09/287,673, filed Apr. 7, 1999, and its continuation-in-part application Ser. No. 09/475,544, filed Dec. 30, 1999, the disclosures of such applications being expressly incorporated herein by this reference. Such continuous filament webs are preferred, because they may be pre-bonded by thermal bonds, which do not interfere with the lamination bonding to the layer 10 of NOMEX® fibers, as is hereinafter explained in detail. Moreover, the filaments of such continuous filament webs are essentially endless, so that there are no ends that could penetrate the layer of NOMEX® fibers and appear at the surface thereof. As a result, there is a surface richness, or high concentration, of NOMEX® fibers at one face, or side, of the resulting laminate. While polyester is the preferred material for the support layer 14, other high melting point thermoplastic materials, such as nylon, can also be used. Moreover, the method of formation of layer 14 is not critical to the invention, and a wide variety of such techniques will be readily apparent to those of skill in the art.

Because the NOMEX® fibers are relatively costly, particularly as compared to the cost of the fibers or filaments of layer 14, the present invention contemplates that the basis weight of layer 10 will be substantially less than the basis weight of layer 14. In this regard, it is contemplated that the basis weight of layer 10 may be from about 1 to about 3 oz./yd.$^2$, whereas the basis weight of layer 14 may be from about 2 to about 5 oz./yd.$^2$. When layer 14 is formed of spunbonded polyester fibers, it is also contemplated that layer 14 may comprise a plurality of sub-layers, with each sub-layer having substantially the same basis weight.

Referring again to the drawing, layers 10 and 14 are disposed in surface-to-surface juxtaposition with one another, and are fed over guide rollers 18 and 20 to entangling drum 22. Layer 14 is disposed against drum 22, and layer 10 faces away from the drum. Water, under high pressure from line 24, is directed against layer 10 from high pressure water jets 26 that are spaced radially outwardly of drum 22. Entangling drum 22 and high pressure water jets 26 may be formed, and operated, as taught by Evans U.S. Pat. No. 3,485,706. Layers 10 and 14 are laminated to one another by the high pressure water streams emanating from jets 26.

The laminate L then is trained over a guide roller 28 and directed to an image transfer device 30, where a three-dimensional image is formed in laminate L. The layer 10 of NOMEX® fibers faces image transfer device 30, and high pressure water from line 24 is directed against the outwardly facing layer 14 from jets 32 spaced radially outwardly of image transfer device 30. Image transfer device 30 and jets 32 may be formed, and operated, in accordance with the teachings of commonly assigned U.S. Pat. Nos. 5,098,764, 5,244,711, 5,822,833, and 5,827,597, the disclosures of which are expressly incorporated herein by this reference. It is presently preferred that the laminate L be given a corduroy appearance, and a three-dimensional forming surface like that illustrated in FIGS. 17–19 of commonly assigned U.S. Pat. No. 5,997,986 (also expressly incorporated herein by this reference) may be suitable for this purpose.

Instead of the two-sided treatment described above, it is possible to produce some products with a single-sided treatment. In accordance with this aspect of the invention, bonding and patterning are completed in a single step and entangling drum 22 and jets 26 are eliminated.

The resulting imaged laminate IL is then fed to a drying station 34, where some or all of the water is removed from the imaged laminate. In accordance with a further aspect of the invention, the imaged laminate is then fed to a chemical application station 36 where a fire-retardant binder is applied to the imaged laminate to stabilize the three-dimensional image, and to provide enhanced flame-retardant and durability properties.

While in its broadest aspects, the present invention is not limited to any particular binder, it has been found that a binder with the following composition has been particularly useful. Such a binder includes about 0.25% Defoam 525, about 0.5% Chem Wet MQ2, about 5.0% Antimigrant 942, and about 20.0% Pyron 6133, all of said constituents being expressed in weight percent and being available from Chemonics Industries. The constituents are mixed in water, about 75% by weight, for about 15 minutes and then applied to the imaged laminate by an appropriate commercially available applicator, such as a standard textile padder. Binder wet pick up of about 130% are generally suitable for the purposes of the present invention. In addition to providing enhanced flame-retardant properties, the added binder imparts wash durability to the imaged laminate, which is important for certain end products.

The imaged laminate with fire-retardant binder thereon is then fed from application station 36 to drying station 38, which may include standard textile drying cans. Once the imaged laminate with applied binder is dried, it is wound upon a winder drum 40 for storage prior to conversion into a final end product.

In accordance with yet another aspect of this invention, the imaged laminate with binder thereon may be jet dyed subsequent to drying and being wound on drum 40. In such a commercially available jet dyeing apparatus, it is possible to apply the dye to polyester layer 14 only, so that the resulting product has two different colors at opposite faces thereof.

What is claimed is:

1. A flame retardant nonwoven fabric comprising: a first layer formed of dimensionally stable, heat-resistant entangled fibers, said first layer having a basis weight of from about 1.0 to about 3.0 oz/yd$^2$, a second spunbond support layer bonded by hydroentanglement to said first layer to form a laminate, said second layer having a basis weight greater than the basis weight of said first layer, and from about 2.0 to about 5.0 oz/yd$^2$; said laminate having a three-dimensional image formed therein by a three-dimensional image transfer device; and said laminate being treated with a fire retardant binder to stabilize said three-dimensional image and provide said laminate with flame retardant characteristics.

2. A fabric as set forth in claim 1 wherein said dimensionally stable, heat-resistant fibers of said first layer are fibers of poly(metaphenylene isophthalamide).

3. A fabric as set forth in claim 2 wherein said second layer is formed of spunbonded polyester fibers.

4. A flame retardant nonwoven fabric comprising: a first layer formed of dimensionally stable, heat-resistant entangled fibers; a second spunbond support layer bonded by hydroentanglement to said first layer to form a laminate, said second layer having a basis weight greater than the basis weight of said first layer; said laminate having a three-dimensional image formed therein by a three-dimensional image transfer device; and said laminate being treated with a fire retardant binder to stabilize said three-dimensional image and provide said laminate with flame retardant characteristics.

5. A flame retardant nonwoven fabric comprising: a first layer formed of dimensionally stable, heat-resistant entangled fibers, and a second spunbond support layer bonded by hydroentanglement to said first layer to form a laminate; said second layer having a basis weight greater than the basis weight of said first layer; and said laminate having a three-dimensional image formed therein by a three-dimensional image transfer device, wherein said second layer is formed of spunbonded polyester fibers.

6. A fabric as set forth in claim 5 wherein said laminate is treated with a fire-retardant binder to stabilize said three-dimensional image and provide said laminate with flame-retardant characteristics.

7. A fabric as set forth in claim 6 wherein said dimensionally stable, heat-resistant fibers of said first layer are fibers of poly(metaphenylene isophthalamide).

8. A fabric as set forth in claim 5 wherein said second layer comprises a plurality of sub-layers of spunbonded polyester fibers, each sub-layer having substantially the same basis weight.

9. A fabric as set forth in claim 5 wherein at least one layer of the fabric is jet dyed.

10. A fabric as set forth in claim 9 wherein said second support layer is jet dyed.

* * * * *